United States Patent [19]

Higgins et al.

[11] Patent Number: 4,501,017
[45] Date of Patent: Feb. 19, 1985

[54] SWITCH CONTROLLER FOR OBTAINING A PLURALITY OF FUNCTIONS FROM A SINGLE SWITCH IN A TWO-WAY TRANSCEIVER AND METHOD THEREFOR

[75] Inventors: Mary L. Higgins; David L. Muri, both of Sunrise, Fla.

[73] Assignee: Motorola, Inc., Schaumburg, Ill.

[21] Appl. No.: 462,486

[22] Filed: Jan. 31, 1983

[51] Int. Cl.³ .......................... H04B 1/44; H04B 1/02; H04Q 7/00
[52] U.S. Cl. ........................................ 455/78; 455/35; 455/38; 455/116; 340/825.44; 340/345
[58] Field of Search ...................... 455/31, 32, 34, 35, 455/38, 77, 78, 79, 84, 116, 91; 375/7, 68, 70; 340/309.15, 345, 696, 825.44; 370/32

[56] References Cited

U.S. PATENT DOCUMENTS

| | | | |
|---|---|---|---|
| 3,500,458 | 3/1970 | Cannalte | 455/79 |
| 3,500,459 | 3/1970 | Battin et al. | 455/78 |
| 3,943,444 | 3/1976 | Lundberg | 455/32 |
| 4,037,158 | 7/1977 | Eastmond | 455/79 |
| 4,072,898 | 2/1978 | Hellman et al. | 340/696 |
| 4,396,910 | 8/1983 | Enemark et al. | 340/309.15 |

OTHER PUBLICATIONS

Motorola—MX 300 Series—"Handie-Talkie" Portable Radios.
Motorola—MC14022B—CMOS MSI.
Motorola—User's Manual—M6805—M146805 Family Microcomputer/Microprocessor.
Motorola—MC146805G2—CM)S 8-Bit Microcomputer.
Motorola—MCM2802—MOS—32×32 Bit Electrically Erasable Programmable Read Only Memory.
Foreign German Manual—Kodieraleitung Funftonfolge—Baustein FK 102-FK 103.

Primary Examiner—Jin F. Ng
Attorney, Agent, or Firm—Jerry A. Miller; James W. Gillman; Edward M. Roney

[57] ABSTRACT

In a transceiver, a multiple function switch decoder includes means for detecting actuation of the switch and means for monitoring the status of the receiver. A timer responsive to the monitoring means and detecting means establishes a predetermined time interval following each switch actuation or each received message of predetermined type. When the switch is actuated during the time interval the transmitter is enabled. When the switch is activated outside the time interval the receiver audio is activated so the user may monitor the channel. During the first switch actuation in any given time interval an encoder is enabled. On subsequent switch actuations during the same time interval the encoder is inhibited. This allows a single switch to perform a plurality of transmitter and receiver functions.

31 Claims, 6 Drawing Figures

SWITCH CONTROLLER FOR OBTAINING A PLURALITY OF FUNCTIONS FROM A SINGLE SWITCH IN A TWO-WAY TRANSCEIVER AND METHOD THEREFOR

BACKGROUND OF THE INVENTION

1. Field of the Invention

This invention relates generally to the field of control circuits for electronic equipment. More particularly, this invention relates to a controller which permits a single switch to perform a plurality of transceiver functions which may be dependent upon the status of the receiver or the transmitter, or the recent actuation history of the switch itself.

2. Background of the Invention

As the state of the art in the electronic industry progresses, the trend is towards ever smaller electronic devices which must reliably perform a variety of functions. An example of this trend may be found in the field of electronic calculators. While the predecessor of the modern pocket calculator literally occupied rooms, devices with similar computational power which will fit in a shirt pocket are now commonplace. Such devices often have control buttons which electronically address a number of different features per button in order to provide the user with a large number of features in a small package. This is accomplished by using a "second feature button" which is actuated prior to the actuation of a button which addresses a plurality of features. Therefore, in order for the user to address the features of his calculator, two button actuations are required to address a single feature.

In the field of portable radio transceivers, there is a similar size reduction trend taking place. As the size of these devices diminishes, the number of control features incorporated in a single control switch must also increase in order for the user to control the additional electronic features incorporated therein.

This is particularly true for selective calling portable radio transceivers (radio transmitter/receivers) such as those commonly used throughout Europe. In these systems the user is required by regulation to monitor his receiver prior to making any transmission to assure that there is no channel activity taking place on the communication channel he intends to use. Once the user establishes that the channel is free of activity, he must normally transmit a series of tones or a digitally encoded message in order to address the receiver or repeater he desires to contact. For example, in the well known ZVEI (Zentral Verband der Elektro-Industrie) system commonly used in Germany, an address code consists of a sequence of five audio frequency tones between 1060 Hz and 2600 Hz which are consecutively transmitted. Each tone has a 70 millisecond duration with no pause between tones. Each tone represents a single digit 0-9 (or a repeat tone indicating that the preceeding digit is repeated). Each user or repeater is assigned a five digit address which must be correctly decoded to access that receiver or repeater. Encoding and decoding circuits for such systems are well known. Having established receiver or repeater access, the user is then free to carry on normal two way voice or data communications with another transceiver.

One scheme often used to accomplish the above sequence of steps is to provide the portable transceiver with three switches. In operation, the user firsts actuates a "push-to-monitor" switch which enables the receiver section audio so that the user may determine if there is activity taking place on the desired radio frequency channel. When the channel is clear, the user actuates a second switch which transmits an appropriate code word in tones or binary digits, as for example, a set of five sequential tones of predetermined length and frequency, to access the desired receiver. The user then actuates a third switch to enable his transmitter and microphone in order to carry on normal conversation.

In the above transceiver scheme, a total of three switches are required to perform even the most basic selective calling transceiver functions. In addition to these controls, the transceiver must also include a volume control, an on/off switch, a squelch control, a channel selector control, and quite possibly many other controls such as a telephone style keypad for more sophisticated transceivers. It is evident that utilizing three separate switches simply to control the sequence of steps necessary for initialization of a conversation is highly inefficient. As these transceivers incorporate more and more features and options, the switch requirement becomes a severe size limitation in a portable or mobile transceiver.

Another scheme often used in portable transceivers, such as Motorola's European version of its MX300 series of transceivers, utilizes a momentary push-to-talk type switch in conjunction with a three position toggle switch. This exemplifies the utilization of a two switch requirement for the selection of any transceiver function. In this scheme a first position of the toggle switch places the radio receiver in a coded squelch mode. This makes the radio reciever responsive only to tone or digitally encoded messages bearing an appropriate user address code. The center position of the toggle switch places the receiver in the carrier squelch mode which allows the receiver to turn on its audio amplifier and speaker upon receipt of any message on the communication channel without regard to coding. The third position of the toggle switch enables the transmitter and transmits the encoded message required to access a receiver or repeater.

In operation, if the user wishes to initiate a call he switches the toggle switch from the coded squelch position to carrier squelch position in order to monitor the channel for activity by other users. He then moves the toggle switch to the encode mode to transmit an appropriate address code to access an appropriate receiver. The user may then utilizes his "push-to-talk" (PTT) switch in a normal manner as necessary to carry on the desired conversation. This system has the advantage of forcing the user to monitor the channel prior to transmitting the code to access a receiver since he has to pass through the carrier squelch position of the three position switch in order to initiate a call. After completing the conversation, the user must switch his transceiver back to the coded squelch mode.

Another two switch system is used in radios such as the GRUNDIG MODEL FK103. In this system a first switch turns ON the receiver audio so that the user may monitor the channel. Deactuation of the switch places the transceiver in a coded squelch mode. Actuation of the second switch while in the coded squelch mode reverts the receiver to carrier squelch and transmits the address code. All subsequent transmissions are without encoding and the first switch is actuated again to place the radio back in the coded squelch mode.

Although these systems reduce the number of switches required to two, operation of the transceiver with one hand can be quite awkward. They inefficiently utilize valuable transceiver controls to actuate only basic transceiver functions not to mention increasing their cost. Also, the user is required in each case to manually place the transceiver back in a coded squelch mode after conversation has ended.

SUMMARY OF THE INVENTION

It is an object of the present invention to provide an improved controller for a multiple function switch.

It is another object of the present invention to integrate a plurality of switching functions in a single switch for a transceiver.

It is another object of the present invention to provide an efficient switch scheme for initiating communications with a portable transceiver in a selective calling communications system.

It is another object of the present invention to provide a controller which allows a single switch to perform a plurality of functions in a portable transceiver as a result of receiver conditions, transmitter conditions, and activity of the switch itself.

It is a further object of the present invention to provide a controller for efficient utilization of switches in a miniature portable transceiver.

In one embodiment of the present invention. A transceiver has a multiple function switch controller including a timer for a establishing a time interval. A first circuit produces a first control signal when the switch is actuated during the time interval, and a second circuit produces a second control signal when the switch is actuated outside the time interval.

In another embodiment of the present invention, a multiple function switch controller includes an apparatus for detecting the actuation of a switch and a circuit for monitoring the status of a communication channel. A timer responsive to either the monitoring circuit or the switch detecting apparatus establishes a time interval. A transmitter enabling circuit enables the transmitter upon actuation of the switch during the time interval and an annunciation circuit annunciates the status of the communication channel upon actuation of the switch outside the time interval.

In another embodiment of the present invention, a transceiver includes a multiple function switch controller having an apparatus for decoding a received signal having a predetermined address. A timer responsive to the decoder establishes a time interval following each received signal having a predetermined address. A first circuit responsive to the actuation of the switch produces a first control signal if the switch is actuated during the time interval. A second circuit produces a second control signal if the switch is actuated outside the time interval.

In another embodiment of the present invention, a transceiver has a multiple function switch controller including a circuit for detecting actuation of the switch and a decoder for decoding received signals of a predetermined type. A timer responsive to either the decoder or the switch detector circuit establishes a time interval following each decoding of a received message of a predetermined type. A controller circuit causes the switch to activate a first function if actuated during the time interval and a second function if actuated outside of the time interval.

In another embodiment of the present invention, a method of controlling a multiple function switch includes the steps of providing a timer to establish time intervals, detecting whether or not the timer's output is predetermined active, counting the number of switch actuations occuring while the output is a predetermined signal, enabling an encoder if the count equals a first predetermined count and inhibiting the encoder if the count is equal to a second predetermined count.

The features of the invention believed to be novel are set forth with particularity in the appended claims. The invention itself however, as to organization, method of use, and method of operation, together with further objects and advantages thereof, may be best understood by reference to the following description taken in conjunction with the accompanying drawings.

DESCRIPTION OF THE PREFERRED EMBODIMENT

Figure 1:
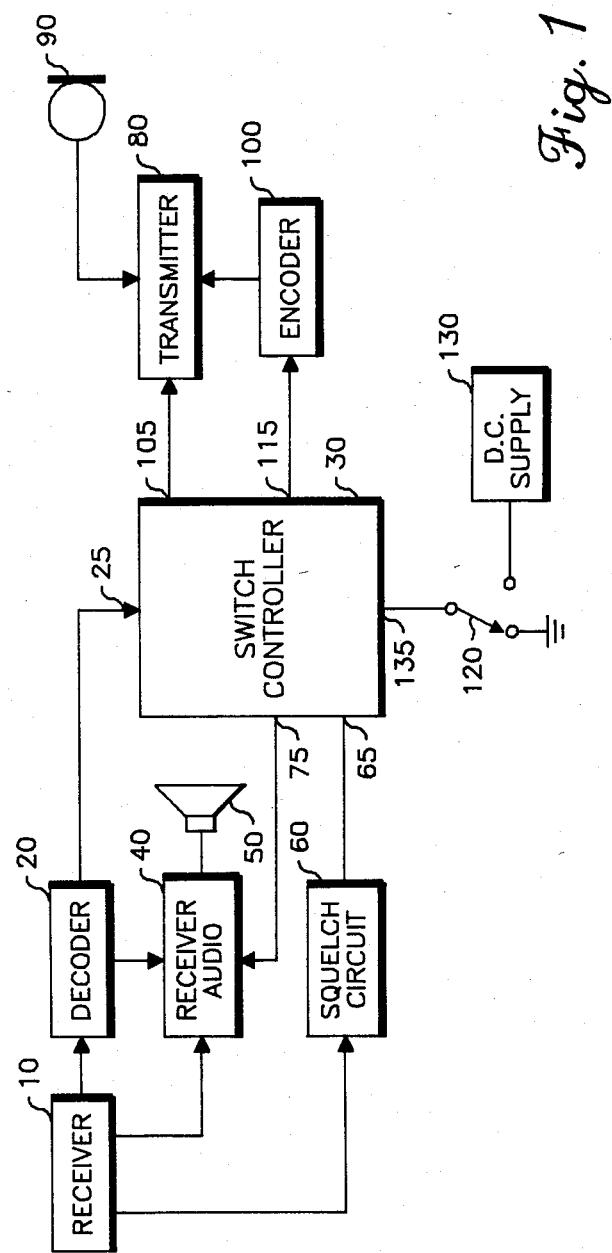
FIG. 1 is a block diagram of a hardware implementation of the present invention embodied in a transceiver.

Turning now to FIG. 1, a receiver 10 is coupled to an address decoder 20 and receives modulated coded information from a radio channel. An address decoder 20 examines that information to determine if the transceiver is being selectively addressed by an appropriately encoded transmission. An indication of a correctly encoded address is then provided to an input 25 of a switch controller 30 for processing. This information is also provided to a receiver audio circuit 40 so that voice information received after the detected coded address may be transferred to a speaker 50 in the preferred embodiment. Receiver 10 also provides a squelch circuit 60 with information, usually audio noise, for the purposes of determining whether or not there is an on channel signal, correctly encoded or not, being received by receiver 10. This squelch information is transferred by switch controller 30 at a controller input 65 where it may be processed and delivered to the receiver audio via an output 75.

A transmitter 80 can receive inputs either from a microphone 90 or an address encoder 100, for modulation and transmission on the radio frequency communication channel. It is understood by those skilled in the art that transmitter 80 as well as receiver 10 may be AM, FM, PM or any combination or variation thereof without loss of generality. In the preferred embodiment, a narrowband FM system is used.

Transmitter 80 is enabled by a signal from switch controller 30 at a controller output 105. Switch controller 30 also determines when encoder 100 should generate an address code by providing encoder 100 with an enabling signal from a controller output 115. In the preferred embodiment a momentary switch 120 is normally grounded on one side. Actuation of the switch connects that side of the switch to a logic high in the form of a DC supply 130. The other side of switch 120 is coupled to an input 135 to switch controller 30.

In operation, the system functions in the following manner. If the user desires to initiate a transmission, he first actuates switch 120. If switch controller 30 has received an indication of channel activity at its input 65, the receiver's audio is turned on by output 75 so that the user may hear that channel activity on speaker 50 thereby annunciating the channel status to the user. In the alternative, other ways of annunciating the channel status such as a visual display or light may be preferred in some cases. When the user has determined that the channel is free of activity he actuates the same switch 120 for a second time. The second actuation must occur within a predetermined time interval established at deactuation of the first actuation of switch 120. Upon receiving the second switch actuation, switch controller 30 sends a control signal at output 115 enabling address encoder 100. It also sends a signal at output 105 actuating transmitter 80. Encoder 100 provides transmitter 80 with the address code, such as a ZVEI tone sequence, for the desired receiver and preferrably instructs transmitter 80 to mute any inputs from microphone 90 while the address is being encoded. Microphone 90 is muted at this time to prevent voices or noises entering the microphone from corrupting the encoder generated address.

After the brief period of time required for the encoder 100 and transmitter 80 to send out the address, microphone 90 is unmuted and the user can begin his conversation. If the party being called responds within a predetermined period of time established by the last deactuation of the user's switch 120, he may do so in an uncoded transmission mode in the preferred embodiment. The present user's receiver will acknowledge receipt of that message by transferring voice information from receiver audio 40 to speaker 50. After receiving that transmission the user will typically respond with more voice information in a manual two-way conversation. This is accomplished by once again actuating switch 120 within a predetermined time interval established at the end of the received transmission as indicated by loss of radio frequency carrier.

Upon a third actuation of switch 120 within a predetermined time interval of receiving the last message, a signal at output 105 once again enables transmitter 80 and voice transmission may once again occur. In one embodiment of the present invention, the user may select at his descretion whether or not encoder 100 is actuated at such a time. This is the type of system option that may be useful in a number of communication systems. The system operates in a manner identical to its operation during the last reception and transmission on subsequent receptions and transmissions as long as they occur within the time interval established by the switch controller 30.

In all cases of the preferred embodiment this time interval begins upon deactuation of switch 120 or the end of a received message. In the preferred embodiment this time interval is controlled by a programmable timer which can be set anywhere from several milliseconds to several minutes. A time interval of approximately 7 seconds has been found to be convenient. If either the receiving or transmitting party fails to respond within the predetermined time interval, the transceiver automatically reverts back to the coded squelch mode. The next actuation of switch 120 causes the transceiver to operate as if it is the first actuation of switch 120 thereby restarting the operation sequence without the necessity of manual intervention by the user.

If, rather than a user initiated transmission, a conversation is initiated by receipt of a properly encoded message, address decoder 20 provides switch controller 30 with a signal at input 25. This signal directs switch decoder 30 to enable transmitter 80 upon the first actuation of switch 120 and places the receiver in a noncoded squelch (carrier squelch) mode. The initial switch actuation which is necessary to prevent interference when initiating a call is bypassed automatically when a conversation is initiated by receipt of a properly encoded message. Since that initial actuation is carried out by the party initiating the call. Thus the controller operation is made dependent on both user initiated switch actuations and messages received from calling parties.

If receiver 10 receives a transmission which is on a proper channel but does not possess an appropriately encoded address, address decoder 20 will not respond and switch controller 30 will not turn on receiver audio 40. Actuation of switch 120 during the time that this improperly encoded signal is being received however, will cause the receiver audio 40 to turn on so that the user is alerted to the presence of an active or busy channel. The receiver audio therefore serves as an annunciation circuit in the preferred embodiment. It will be clear to those skilled in the art that other ways of alerting the user to the presence of channel activity are readily implemented.

Figure 2:
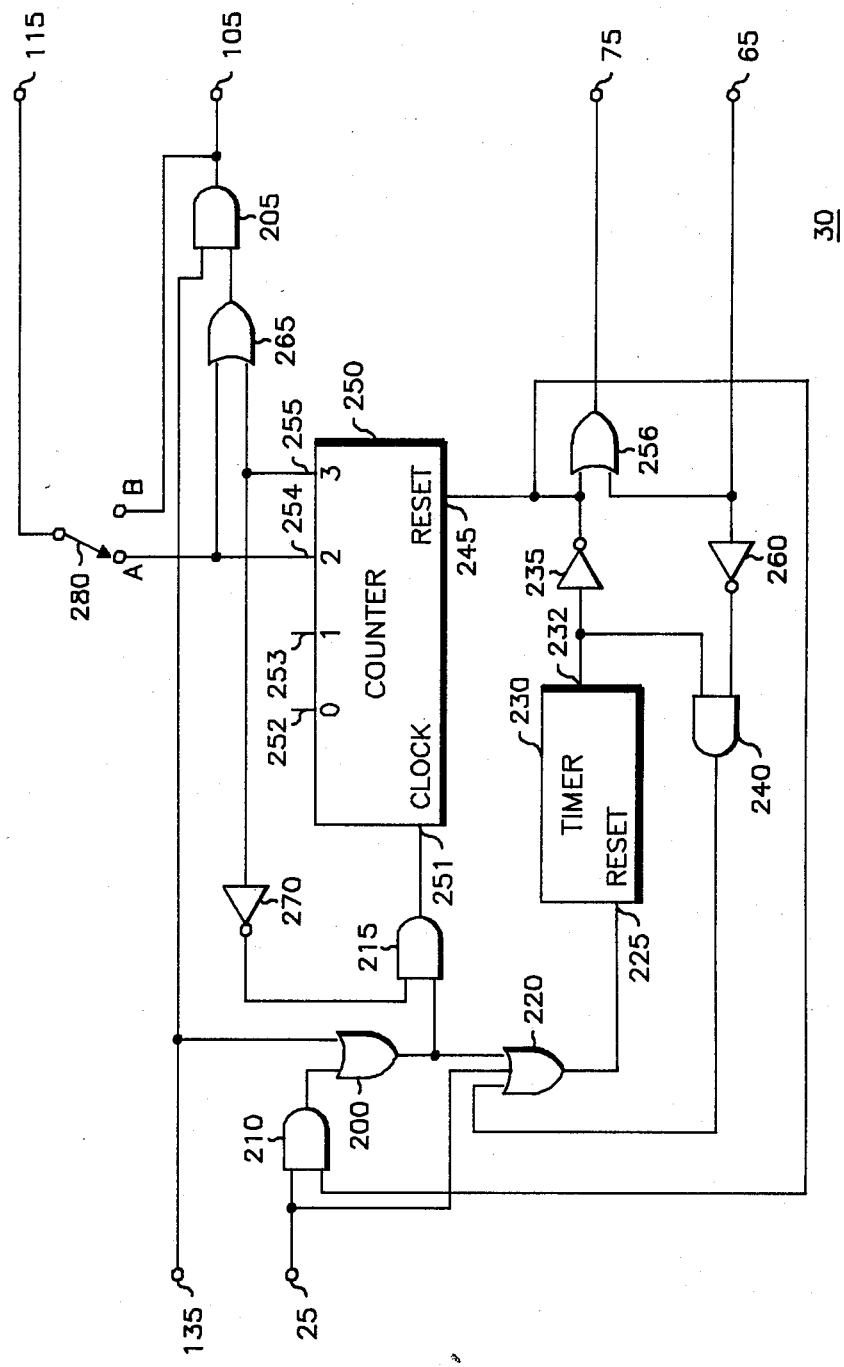
FIG. 2 is a detailed electrical schematic of a hardware embodiment of the controller portion of the present invention.

Turning now to FIG. 2 for one embodiment of switch controller 30, input 135 is coupled to one input of an OR gate 200 and one input of an AND gate 205. Input 25 is coupled to one input of an AND gate 210. The output of an AND gate 210 is coupled to a second input of an OR gate 200. The output of an OR gate 200 drives one input of an AND gate 215 and one input of an OR gate 220. Input 25 is also coupled to a second input of OR gate 220. The output of an OR gate 220 is coupled to a reset input 225 of a timer 230. An output 232 of timer 230 is coupled to the input of an inverter 235 and one input of an AND gate 240. The output of AND gate 240 is coupled to a third input of an OR gate 220.

The output of inverter 235 is coupled to the reset input 245 of a counter 250 and the output of AND gate 215 is coupled to a clock input 251 of counter 250. Counter 250 in this embodiment is preferrably a commercially available Johnson counter with code converter having four digital outputs shown in FIG. 2 and designated 0, 1, 2, and 3 respectively and numbered 252, 253, 254 and 255, respectively in FIG. 2. However, it will be evident to those skilled in the art that many other types of counter circuits may be substituted for the Johnson counter of this embodiment.

It is understood that counter 250 is reset upon power-up. That is, 1 0 0 0 appears at outputs 0, 1, 2, and 3 respectively upon initial power-up of controller 30. Also, it is understood that timer 230 is not timing upon power-up of the system. That is, when power is applied a logic zero appears at the output of timer 230. Although further circuitry which is not shown is required to establish such an initialization, addition of that circuitry is well known and will not add materially to the understanding of the present invention. It will be evident to one skilled in the art that the design addition of that circuitry is readily accomplished.

The output of inverter 235 is coupled to one input of an OR gate 256 and one input of an AND gate 210. A second input of an OR gate 256 is coupled to squelch input 65 and the input of an inverter 260. The output of inverter 260 drives a second input of AND gate 240. The output of OR gate 256 is the audio enable output 75 of decoder 30.

Output 255 of counter 250 is coupled to one input of an OR gate 265 and to the input of an inverter 270. The output of inverter 270 is coupled to a second input of AND gate 215. Output 254 of counter 250 is coupled to a second input of an OR gate 265. The output of OR gate 265 is coupled to a second input of AND gate 205. The output of AND gate 205 is the transmit enable output 105. Outputs 252 and 253 of counter 250 are not used in controller 30 but are shown here to complete the discription.

Encoder enable output 115 is selectively coupled by a two position jumper or switch 280 to either counter output 254 (if switch 280 is in position A) or transmit enable output 105 (if switch 280 is in position B). If switch 280 is in position A, the address encoder 100 of FIG. 1 will be operative only on the first actuation of switch 120 after the timer starts timing and subsequent transmissions will be unencoded. If switch 280 is in position B, the encoder will be enabled each time a transmission occurs during the timer interval (each time the transmitter is enabled).

Figure 3:
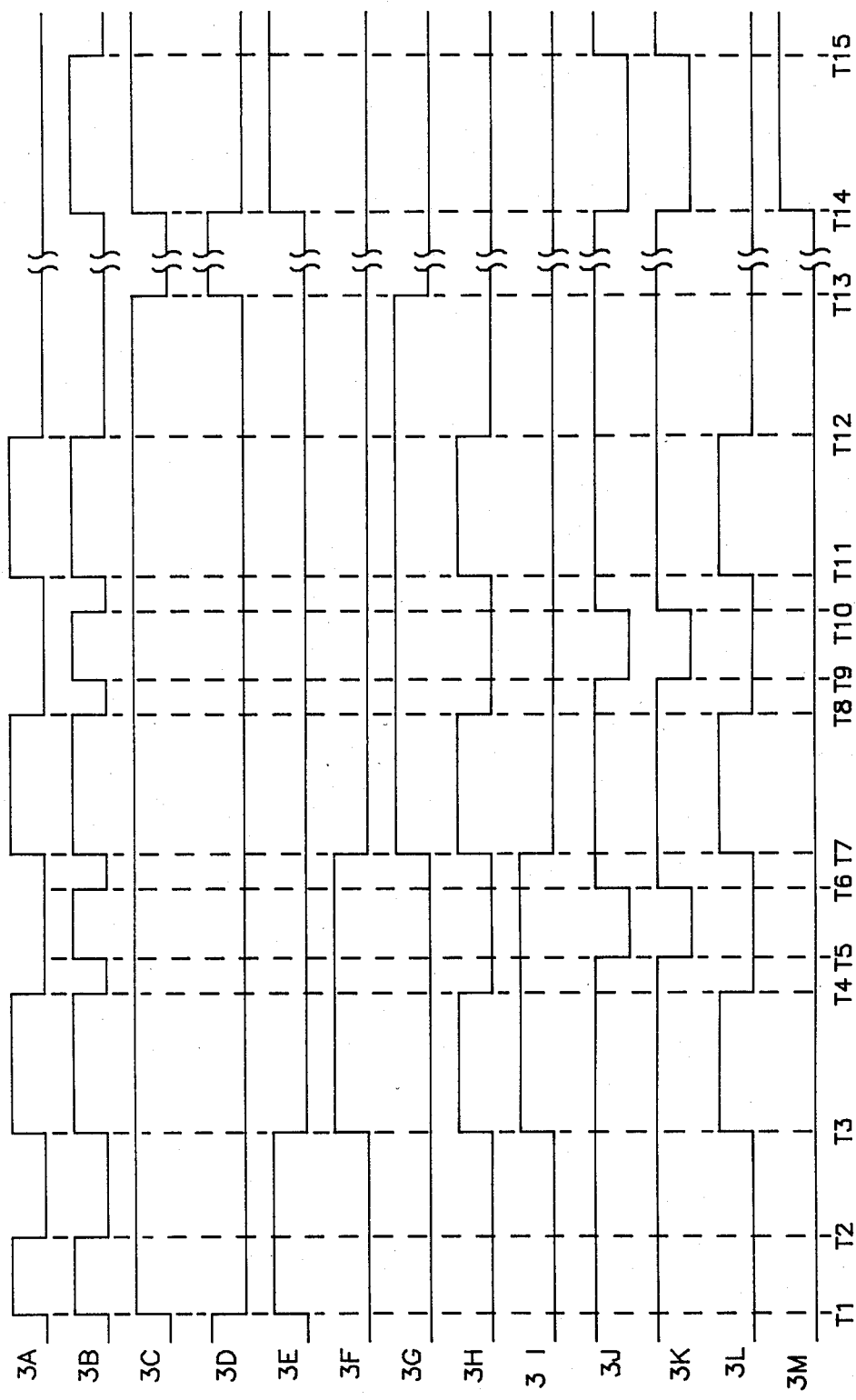
FIG. 3 is a timing diagram of the conroller of FIG. 2.

FIG. 3 is a timing diagram of the circuit embodiment of FIG. 2. Although outputs 252 and 253 of counter 250 are not utilized in the circuit of FIG. 2, they are included in timing diagram FIG. 3 for the purpose of illustrating the operation of the particular type of Johnson counter used in this embodiment. Commercially available Johnson counters such as the MC14022 counter produced by Motorola Inc. as well as other counters are entirely suitable for this application. Similarly, numerous timing circuits, such as analog one-shot type timers and clocked digital counter based circuits, to be used for timer 230 will occur to those skilled in the art.

The timing diagrams of FIG. 3 includes FIGS. 3A through 3M wherein FIG. 3A represents the signal at switch input 135, FIG. 3B represents the signal present at the reset input 225 of timer 230 and FIG. 3C represents the signal present at the output 232 of timer 230. FIGS. 3D, 3E, 3F and 3G respectively represent the signals present at outputs 252, 253, 254, and 255 of counter 250, respectively. FIG. 3H represents the signal present at transmit enable output 105. FIG. 3I represents the signal present at encode enable output 115 in the case of switch 280 set in the A position. FIG. 3J represents the signal present at squelch input 65. FIG. 3K represents the signal present at audio enable output 75. FIG. 3L represents the signal present at encoder enable output 115 in the case of switch 280 set to the B position. FIG. 3M represents the signal present at decoder input 25.

At a time T1 OF FIG. 3 the user actuates switch 120 for a first time to initiate a call causing a logic high to appear at input 135. This causes a logic high to appear at the reset input 225 of timer 230 which in turn causes the output 232 of timer 230 to become active and go to a logic high. Counter 250 is clocked at this time causing output 253 to go high, output 252 to go low and outputs 254 and 255 to remain at a logic low. Assuming the squelch input is at a logic high, indicating no channel activity, the user will hear that he has a clear channel and will release switch 120 at time T2. This causes a low going logic transition at the reset input 225 of timer 230 which causes the timer to begin timing its predetermined time interval.

At time T3, the timer interval started at time T2 has not yet expired, and the user once again actuates switch 120 causing a low to high logic transition at input 135. This once again resets timer 230 holding its output high and causes counter 250 to be clocked to its next state wherein output 254 is at logic high and outputs 252, 253 and 255 are at logic lows. This state of the counter causes a logical low to high signal transition at transmitter enable output 105 and encoder enable output 115. This causes the transmitter to be active and the encoder to provide the transmitter with the address of the party being called. This occurs whether switch 280 is in either position A or B. Since the output of the timer is held high by the constant reset input caused by actuation of switch 120, the audio is always disabled when the transmitter is enabled. Normally the encoder will require only a very brief period of time (typically less than 0.5 seconds) to encode an address to be transmitted by the transmitter. During this time, the transmitter will normally mute the microphone 90 of FIG. 1 and transmit the code address.

After the code address has been transmitted, the microphone 90 will be unmuted and voice transmission may proceed. Alternately, if data transmission is desired it may take place after the addressing process is completed. At the end of the voice or data transmission, switch 120 is deactuated at a time corresponding to T4 of FIG. 3. The deactuation disables the transmitter and, if switch 280 is in position A, disables the encoder. The low transition at the reset input 225 of timer 230 once again causes the timer to begin its predetermined time interval.

At time T5 the party being called responds with a transmission of his own. This causes squelch input 65 of the formerly transmitting and now receiving unit to go to a logic low causing audio enable output 75 to go low turning on the receiver's audio allowing the user to hear the message being received. The received audio also turns on the reset input 225 of timer 230 thereby holding the output at a logic high. At time T6 the received message ends causing the squelch input 65 to go back to a logic high which in turn causes the audio to be disabled by the high going transition at output 75. The change at input 65 causes timer 230 which had been reset by the logic high on input 65 to start its time interval once again.

At time T7, the user once again actuates switch 120 to respond to the message received between T5 and T6 causing input 135 to go high and reseting the timer. The counter is once again clocked to the next count causing its output 255 to go to a logic high while outputs 252, 253 and 254 are at a logic low. The transmitter is enabled by output 105 and, if switch 280 is in position B, the encoder 100 of FIG. 1 is once again enabled. If switch 280 is in position A an unencoded transmission will occur. If the encoder 100 is enabled, voice or data may be transmitted after the address is encoded and transmitted. If the encoder is not enabled voice or data information may be transmitted immediately.

At time T8 switch 120 is deactuated causing input 135 to once again return to a logic low. This causes a high to low transition at the timer reset input 255 which restarts the timing of the predetermined time interval. The signal at output 255 of counter 250 is fed back through inverter 270 and AND gate 215 to prevent further actuations occurring while the output 232 of timer 230 is active (logic high) from clocking counter 250. Therefore, there is no change in counter outputs 252, 253, 254 or 255 on any subsequent transmission unless timer 230 times out to the end of its time interval. This will cause the counter 250 to reset to its original state prior to time T1.

The time interval from T9 to T10 represents a received message similar to that occuring between time T5 and T6. Although counter 250 is at a different count, the controller 30 responds to this incoming message in a manner identical to its response between T5 and T6. Similarly, the decoder responds to subsequent transmissions such as that occuring between time T11 and T12 the same as transmissions occuring between time T7 and T8 as long as the timer output 232 is at a logic high.

At time T13 the output 232 of timer 230 becomes inactive and goes to a logic low indicating that the predetermined time interval of timer 230 has expired. This resets counter 250 to its initial state just prior to time T1. Actuations of switch 120 occuring subsequent to time T13 will cause controller 30 to respond as it did at time T1 restarting the entire cycle.

At time T14, the response of controller 30 to correctly encoded incoming messages is shown. That is, the conversation is inititated by another transceiver addressing the transceiver of the present user. At this time input 25 makes a low to high transition as a result of a correctly decoded address by decoder 20. This causes a logic low to logic high transition at the timer reset input 225 which in turn causes the timer output 232 to go high. The incoming signal at input 25 also causes counter 250 to be clocked causing its output 253 to go high and its output 252 to go low. Outputs 254 and 255 remain at a logic low. Since a decoder output implies that a signal is being received, squelch input 65 makes a logic high to a logic low transition and audio enable output 75 goes low turning on the receivers audio circuits.

At time T15 the incoming message ends causing the timer 230 to begin timing its predetermined interval and the audio to be disabled. It should be noted that after time T15 controller 30 is in exactly the same set of logic states that it was in after time T2. Therefore it is evident that a response by the user of actuating switch 120 will cause the same response as that which occurred at time T3. That is, a transmission with an encoded address will occur. It will be evident to those skilled in the art, that the minor modification of causing no address encoding when communication is initiated by receipt of a correctly encoded incoming message may be readily implemented by clocking counter 250 more than once as a result of a logic high at the output of AND gate 210.

Figure 4:
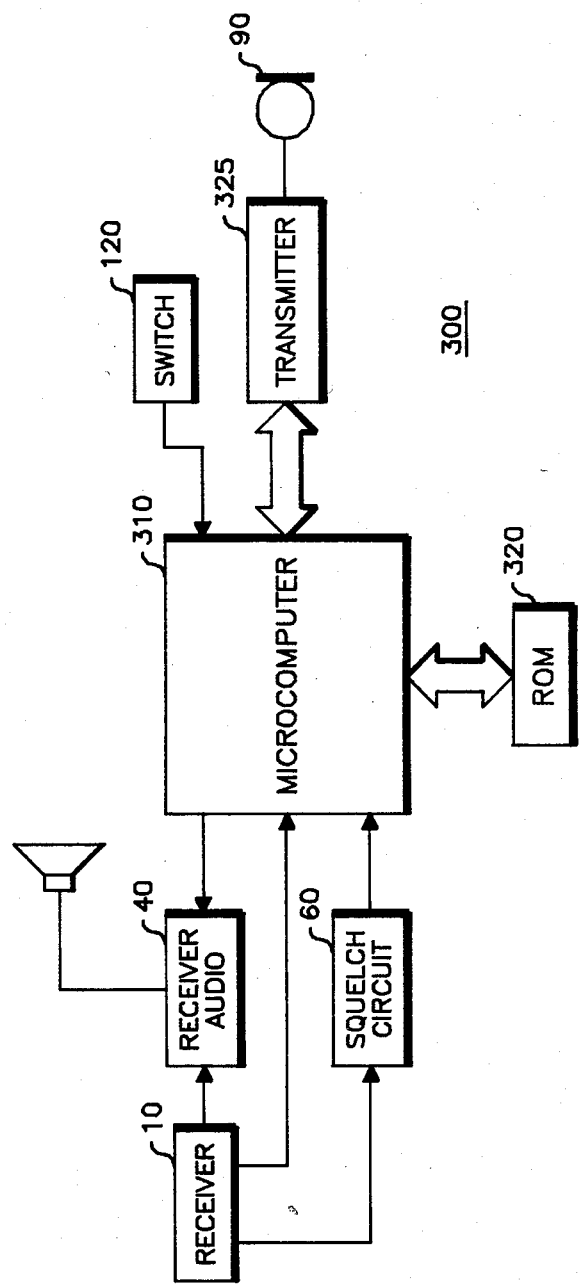
FIG. 4 is a system block diagram for a microcomputer implementation of the present invention embodied in a transceiver.

Turning now to FIG. 4, it will be evident to one skilled in the art that a microprocessor or microcomputer is ideally suited to perform the functions of controller 30 in an equivalent embodiment shown in FIG. 4 as system 300. In this system a microcomputer 310 along with its associated "code plug" ROM 320 will preferably perform the functions not only of controller circuit 30 but also of other radio functions such as that of the address decoder 20 and address encoder 100 of the system of FIG. 1 but this is not intended to be limiting. In this system, micro-computer 310 accepts incoming information from receiver 10, squelch circuit 60, and switch 120 and delivers appropriate signals to receiver audio 40 and transmitter 325. It will be appreciated that transmitter 325 may alternately include an encoder such as encoder 100 and receiver 10 may alternately include a decoder such as decoder 20. Preferrably, however, the micro-computer would handle these functions. Micro-computers such as the widely available Motorola MC146805G2 as well as others is suitable for performing these functions.

In this embodiment, ROM 320 serves as a "code plug" which is used to program the transceiver with various options and information necessary to the transceivers standard operation. Information such as tone duration, tone frequency, etc may be stored therein and programmed to meet various user or system requirements. The switch 280 of controller 30 is preferrably replaced by one bit of digital information in ROM 320 for system 300.

Figure 5:
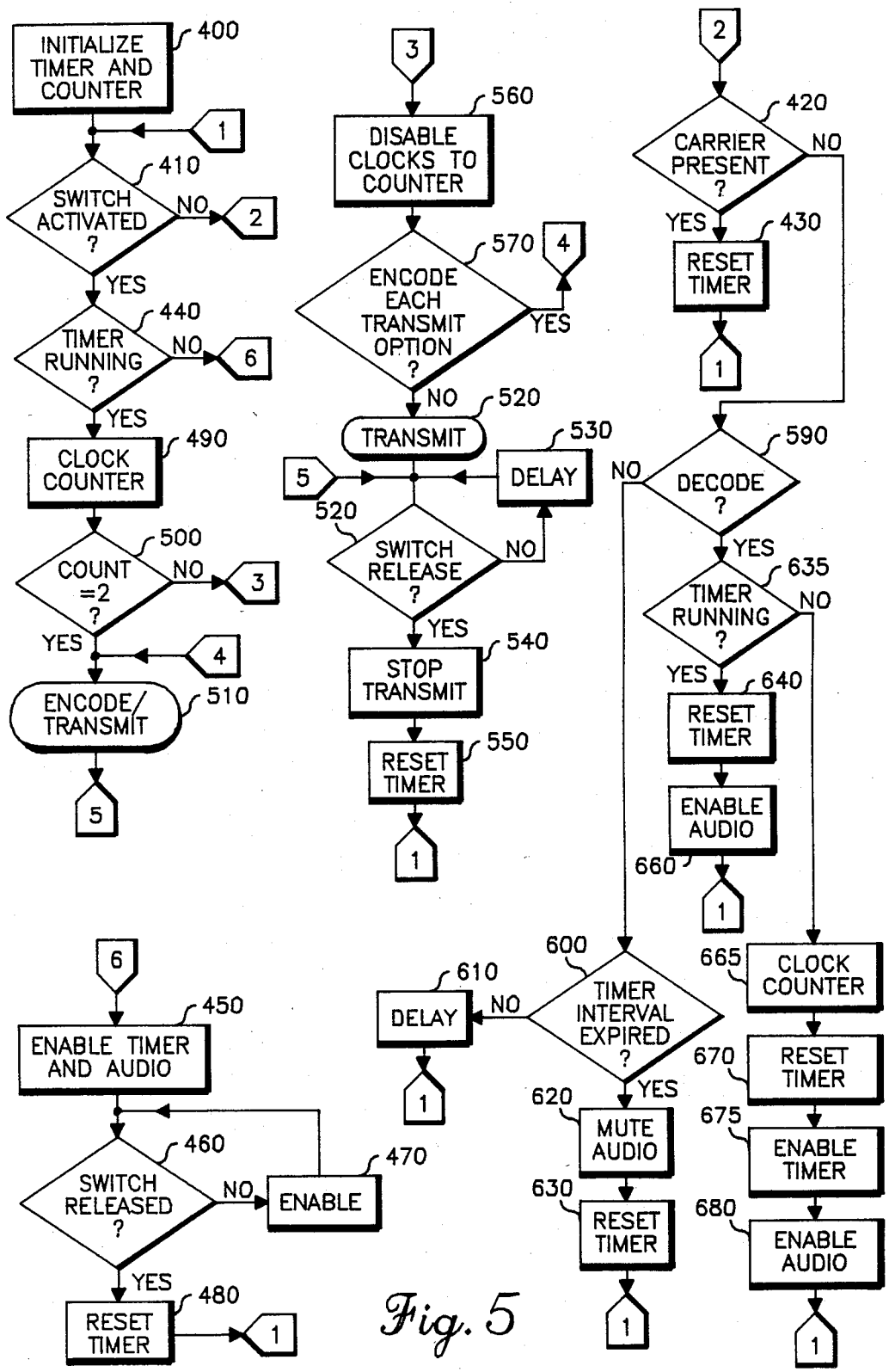
FIG. 5 is a flow chart detailing the operation of the controller portion of the present invention.

FIG. 5 shows a flow chart of one method of programming micro-computer 310 to perform the functions of the present invention. This flow chart is designed to parallel the operation of hardware switch controller 30 and the reader should be aware that decision blocks do not uniformly show the result of a "yes" answer at the bottom of the diamond shaped blocks. It will occur to those skilled in the art that many other flow charts will result in firmware which will equally well perform the desired functions, therefore, the flow chart of FIG. 5 is not intended to be limiting as the only program sequence which would perform the function of the present invention.

Program step 400 of the flow chart of FIG. 5 encompasses the first steps of the program wherein a timer, counter and other circuitry will be initialized upon powering up the system. The program looks for a switch actuation at step 410 and if none is found proceeds to step 420 where the receiver squelch circuit is inspected to see if a radio frequency carrier is present. If carrier is present the timer is reset and a brief delay occurs at steps 430 and the program is returned to step 410. If the switch has been actuated step 440 checks to see if the timer is running. If not, step 450 enables the audio until step 460 detects a switch release. Until the switch release occurs periodic delays are encountered through steps 470 until the switch is released.

When the switch is released the timer is reset at step 480 and the program returns to step 410. If at step 440 it is determined that the timer is running, step 490 clocks the counter. If the counter's count equals 2 at step 500, the encoder is activated along with the transmitter at step 510. The transmitter remains activated until steps 520 and 530 determine that the switch has been released. At that point. Step 540 stops transmission and step 550 resets the timer. The program is then returned to step 410.

If at step 500 the count is not equal to two, step 560 disables the clock to the counter. Step 570 determines whether or not the user desires to encode upon each transmission or not. If so the program returns to step 510 and if not the program simply turns on the transmitter at step 580 without enabling the encoder. The program then proceeds to step 520.

If at step 420 it is determined that carrier is not present, step 590 determines if a message has been is properly encoded and correctly decoded. If not step 600 checks to see if the timer's interval has expired. If not a delay is encountered at step 610 prior to returning the program to step 410. If the timer's interval has expired at step 600, the audio is muted at step 620 and the timer is reset at step 630. The program then returns to step 410.

If at step 590 the signal was appropriately decoded, step 635 checks to see if the timer is running. If so, step 640 resets the timer and step 660 enables the receiver's audio. The program then returns to step 410. If at step 635 the timer is not running, step 665 clocks the counter, step 670 resets the timer, step 675 enables the timer and step 680 enables the audio. The program then returns to step 410. If it is desirable not to transmit an address code on the first actuation of the switch 120 occuring after receipt of a correctly encoded message, step 665 should clock the counter twice, otherwise an address will be encoded on the first transmit.

Figure 6:
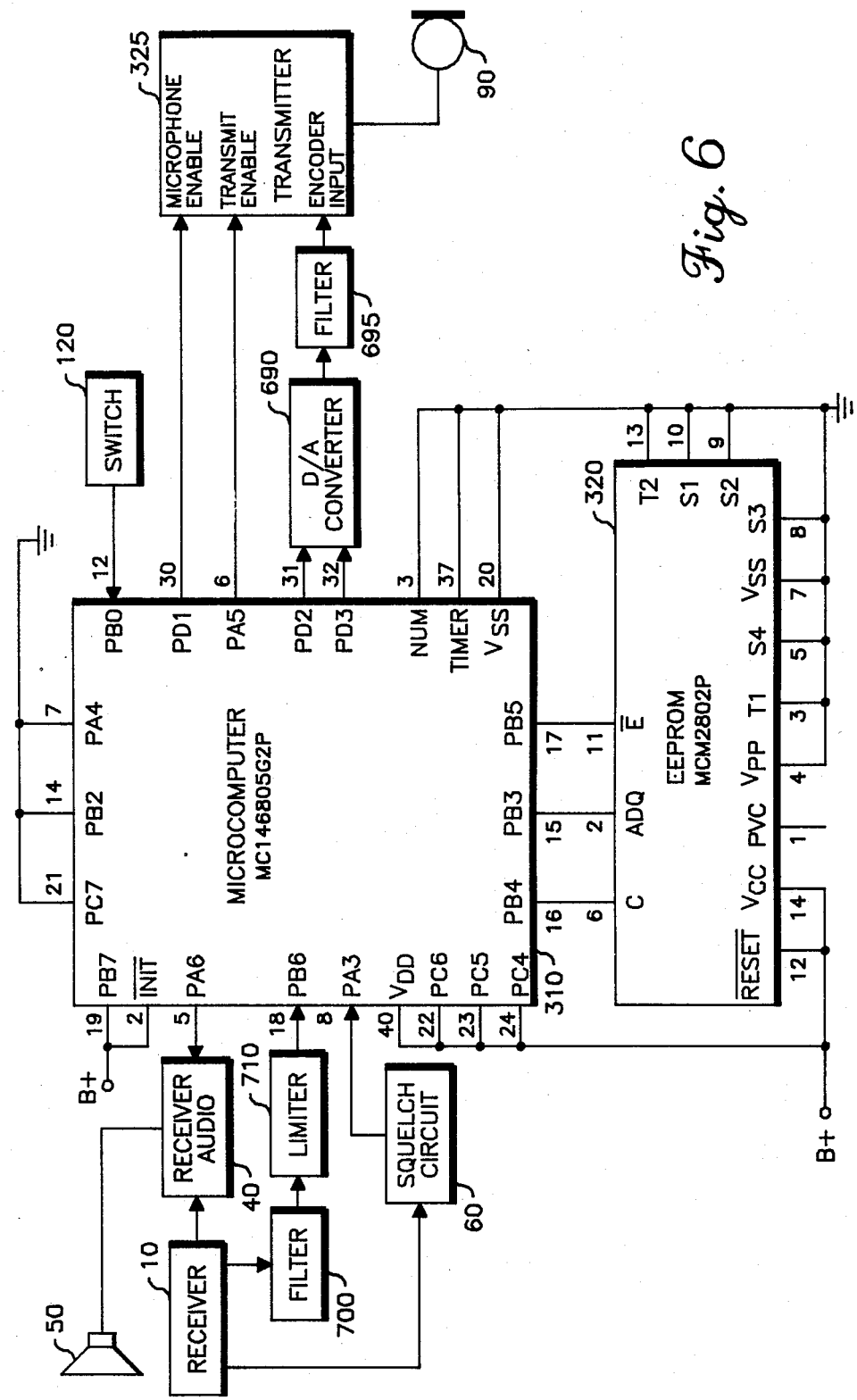
FIG. 6 is a combined functional block diagram and electrical schematic showing the hardware to utilize a preferred microprocessor embodiment of the present invention for FIG. 4.

Turning now to FIG. 6 a diagram of the actual hook up for the preferred firmware embodiment of the present invention is shown. This embodiment utilizes the Motorola MC146805G2P microcomputer in conjunction with the MCM2802P programmable ROM. The details of using this particular widely available microprocessor/microcomputer family are well known and documented in the "M6805/M146805 Family Microcomputer/microprocessor User's Manual" published by Motorola, Inc., 3501 Ed Bluestein Blvd., Austin, Tex. 78721. The contents of the above referenced manual is hereby incorporated by reference. Details of the microprocessor itself may be found in the commonly published "Motorola Microprocessor Data Manual" in the section entitled "MC146805G2", the contents of which is also hereby incorporated by reference. In FIG. 6, the actual transceiver functions are represented in block diagram form and one skilled in the art will readily know how to accomplish the appropriate interfacing to those functions. Also, pin numbers for the plastic dual in-line package versions of the microcomputer and ROM are circled and shown adjacent the appropriate I.C. terminals.

TABLE I

```
0000 00 00 00 00 00 00 00 00 00 00 00 00 00 00 00 00
0010 00 00 00 00 00 00 00 00 00 00 00 00 00 00 00 00
0020 00 00 00 00 00 00 00 00 00 00 00 00 00 00 00 00
0030 00 00 00 00 00 00 00 00 00 00 00 00 00 00 00 00
0040 00 00 00 00 00 00 00 00 00 00 00 00 00 00 00 00
0050 00 00 00 00 00 00 00 00 00 00 00 00 00 00 00 00
0060 00 00 00 00 00 00 00 00 00 00 00 00 00 00 00 00
0070 00 00 00 00 00 00 00 00 00 00 00 00 00 00 00 00
0080 24 04 16 01 20 02 17 01 18 01 19 01 81 A6 60 B7
0090 09 A6 21 B7 04 AE 10 A6 14 B7 3B A6 0A B7 3D CD
00A0 00 ED 3A 3D 26 F9 B6 10 26 04 9C CC 06 42 81 B7
00B0 3B A6 4E B7 3A 20 06 B7 3B A6 46 B7 3A A6 08 B7
00C0 3C BE 3A F6 3C 3A BE 3B F7 3C 3B 3A 3C 26 F2 81
00D0 4F 05 01 00 49 0F 02 00 49 81 14 72 18 72 05 3F
00E0 05 05 6C 02 1A 68 3F 69 3F 6A 3F 6B 81 1F 03 16
00F0 05 1A 01 17 01 ED 88 ED 88 E6 77 46 ED 80 46 ED
0100 80 E6 3B B7 3C 38 3C 38 3C 38 3C A6 08 38 3C ED
0110 80 4A 26 F9 17 05 A6 20 1B 01 20 02 ED 88 06 01
0120 00 79 69 01 69 02 69 03 4A 26 F1 9F AB 04 97 3C
0130 3B 1E 03 81 ED 8D AE 2E 20 04 ED 8D AE 30 12 72
0140 E6 2D B7 65 E6 28 B7 3C 20 1E ED 8D E6 29 B7 3C
0150 AE 56 E6 2B 20 0E 1A 00 20 2A ED 8D E6 2A B7 3C
0160 AE 5B E6 2C 27 F0 B7 65 1A 00 A6 02 B7 3D A6 8C
0170 B7 08 A6 07 B7 09 8F A6 08 4A 26 FD 3A 3D 26 EE
0180 3A 65 26 E6 A6 60 B7 09 02 72 2A A6 FF B7 75 A6
0190 05 B7 44 BF 39 21 FE BE 39 F6 A4 0F A1 0F 26 03
01A0 CC 02 62 E1 75 26 08 A6 0F B7 75 A6 24 20 05 B7
01B0 75 48 AE 10 97 F6 B7 37 B7 45 E6 01 B7 38 0E 72
01C0 3A A6 FC B7 07 A6 94 B7 03 E6 38 B7 08 3F 09 8F
01D0 A6 02 9D 4A 26 FD A6 9C B7 03 E6 38 B7 08 3F 09
01E0 8F E6 38 B7 08 3F 09 8F A6 02 9D 9D 4A 26 FD 01
01F0 72 12 0F 01 0A A6 60 B7 09 20 65 A6 EC 20 C4 1E
0200 37 9D 20 08 9D 9D 9D 9D 9D 21 FE A6 84 B7 03
0210 E6 38 B7 08 3F 09 8F A6 02 9D 4A 26 FD A6 80 B7
0220 03 E6 38 B7 08 3F 09 8F E6 38 B7 08 3F 09 8F 21
0230 FE 9D 9D 9D 9D 3A 37 26 0B 3A 3C 27 12 E6 45 B7
0240 37 CC 01 C5 9D 21 FE 9D 9D 9D 9D CC 01 C5 9D
0250 9D 9D 9D 21 FE A6 84 B7 03 A6 01 B7 3C 03 72 07
0260 13 72 A6 94 B7 03 81 3A 44 27 F7 3C 39 A6 07 4A
0270 9D 26 FC CC 01 95 A6 60 B7 09 80 04 68 7B 06 68
```

TABLE I (cont'd)

```
0280 03 CC 03 8D ED D0 B8 77 27 05 1C 09 CC 06 17 0B
0290 68 08 0B 3F 05 07 00 02 BD DE 17 68 AE 01 A6 FE
02A0 B7 3D B7 02 09 02 38 5C 0B 02 34 5C 0D 02 30 5C
02B0 39 3D B6 3D B7 02 08 3D EB 03 68 15 3A 66 26 11
02C0 11 68 13 68 A6 21 B7 04 10 00 0E 68 04 15 6C 3F
02D0 70 81 B7 67 12 68 A6 01 B7 66 81 A6 03 20 F9 BF
02E0 73 9F 03 68 ED B1 67 26 D3 00 68 EF 3C 66 A6 03
02F0 B1 66 26 DD 10 68 14 68 81 15 68 1D 03 B6 73 A1
0300 0A 27 6E A1 0C 26 1D A6 E0 B7 04 B6 76 B7 00 1D
0310 68 AE 55 5C A3 60 24 4D F6 2A F8 BF 74 B6 42 B7
0320 71 18 68 81 A1 0B 26 02 3F 73 09 43 10 B1 63 26
0330 0C B6 62 B1 74 27 4B AB 05 B1 74 27 45 0B 43 06
0340 B6 73 B1 61 27 3C A6 E0 B7 04 B6 76 B7 00 1D 68
0350 09 68 19 B6 73 BE 74 AA 80 F7 5C A3 60 24 06 F6
0360 2A F8 BF 74 81 19 68 A6 C0 B7 71 81 B6 42 B7 71
0370 81 0D 04 03 0C 00 15 0D 71 08 1B 72 ED DA 7C CC
0380 05 62 A6 E6 B7 04 B6 76 B7 00 1D 68 81 16 68 B6
0390 6A A4 1E 27 04 1D 07 20 02 1C 07 B6 6C B7 6D 01
03A0 01 0F 01 6D 08 3A 6E 27 13 10 6C 20 11 3F 6E 20
03B0 0B 00 6D F5 3C 6E A6 03 B1 6E 27 ED 11 6C 0F 01
03C0 0F 03 6D 08 3A 6F 27 13 12 6C 20 11 3F 6F 20 0B
03D0 02 6D F5 3C 6F A6 03 B1 6F 27 ED 13 6C 0F 43 12
03E0 08 00 12 05 6D 08 3A 70 27 16 14 6C 20 14 3F 70
03F0 20 0E 08 00 EE 04 6D F2 3C 70 A6 03 B1 70 27 EA
0400 15 6C B6 6D B8 6C 27 62 1B 72 10 04 1D 03 46 24
0410 2D 01 6C 2C 1E 68 BD DE 05 6C 14 07 3F 0B 05 72
0420 19 08 3F 05 08 72 0E 18 72 16 72 B6 43 20 61 14
0430 72 18 72 20 E6 16 72 9C 20 76 14 72 20 1A 1B 68
0440 46 24 09 03 6C 06 1F 04 B6 42 20 44 46 24 1A 1F
0450 68 04 6C 07 14 72 18 72 1D 04 81 15 72 19 72 1C
0460 04 0F 43 03 1D 00 81 1C 00 81 B6 35 4B BB 69 B7
0470 69 4F B9 6A B7 6A 4F B9 6B B7 6B 0C 43 0E B1 60
0480 26 E7 0B 68 E4 1F 68 AD D2 1B 68 81 B6 6A 20 EE
0490 B7 3A 9C A6 21 B7 04 B6 3A A4 0C A1 08 26 3D 06
04A0 72 03 CC 05 39 03 3A 08 00 3A 0B CD 01 34 20 0C
04B0 A6 60 B7 09 20 06 03 01 F2 CD 01 3A 1A 00 1D 03
04C0 A6 FF B7 08 A6 05 B7 09 8F 01 01 0A 3A 6E 26 F0
04D0 17 72 11 6C 20 3F A6 03 B7 6E 20 E4 05 3A 0E 06
04E0 3A 05 CD 01 34 20 06 03 01 F8 CD 01 3A 01 3A 35
04F0 03 3A 0F 0D 71 32 CD 01 4A CD 01 5A 20 10 9D 9D
0500 20 13 0F 71 2B CD 01 5A 0D 71 03 CD 01 4A 0A 42
0510 ED B6 42 B7 71 A6 CE B7 07 A6 84 B7 03 06 72 9C
0520 1B 00 CC 06 6A 02 3A 05 0F 71 05 20 CC 0C 71 DB
0530 06 72 DB 04 42 D8 CC 06 D8 03 3A 10 00 3A 05 CD
0540 01 34 20 D1 03 01 F8 CD 01 3A 20 C9 10 72 01 3A
0550 08 03 01 05 CD 01 3A 20 03 CD 01 34 11 72 13 6C
0560 20 B3 09 42 A6 20 8F 9C BD 8D A6 01 B7 3C A6 04
0570 B7 65 A6 80 B7 72 AE 32 CD 01 68 1B 00 CC 06 17
0580 A6 60 B7 09 1D 03 1E 68 0C 72 10 01 3F 0D CD 01
0590 5A A6 CE B7 07 A6 84 B7 03 1B 00 03 3F 30 1A 72
05A0 1C 68 0D 72 47 A6 D2 B7 3C A6 E2 B7 04 B6 76 B7
05B0 00 A6 5D B7 08 A6 06 B7 09 CD 02 7B 8F 21 FE 0B
05C0 72 0C 0D 68 13 3A 3C 27 05 0C 72 E5 20 38 1B 72
05D0 1D 68 A6 21 B7 04 10 00 0D 72 0C 0D 3F 04 1C 07
05E0 1C 03 BD DA CC 06 6A 0F 3F F8 20 F2 A6 7D B7 3C
05F0 A6 12 B7 3B A6 E9 B7 04 B6 76 B7 00 A6 9C B7 08
```

```
0600  A6 06 B7 09 20 E3 3A 3B 26 F2 00 04 E3 A6 07 B7
0610  3E 10 04 10 00 20 E5 9C A6 21 B7 04 A6 01 B7 00
0620  A6 30 B7 05 A6 0F B7 06 A6 CE B7 07 A6 84 B7 03
0630  4F B7 01 B7 02 B7 6C B7 6E B7 6F B7 70 B7 72 B7
0640  68 9A BD D0 B7 77 A6 0A B7 3B AE 3E A6 0A B7 3D
0650  BD ED 3A 3D 26 FA B6 44 BB 45 A1 A5 26 E4 B6 42
0660  B7 71 4F 0F 43 02 A6 C0 B7 76 9C B6 40 B7 45 B6
0670  3E B7 39 3F 37 1D 72 A6 60 B7 09 CD 08 28 3F 3C
0680  3F 3D AE 10 CD 08 17 AE 23 CD 08 17 B6 22 B7 14
0690  B6 20 B7 12 B6 21 B7 13 B6 34 B7 26 B6 35 44 44
06A0  44 B7 27 A6 70 B7 08 3F 09 3F 36 B6 14 B0 27 2B
06B0  12 1A 36 26 04 B6 35 20 0B B7 14 BE 27 B6 35 B7
06C0  27 20 0B 40 B7 27 BE 14 B6 22 B7 14 14 36 8F CD
06D0  07 3C 04 36 03 CD 02 7B B6 36 A4 09 26 05 03 36
06E0  C8 20 87 07 36 05 01 39 02 1C 72 3C 37 34 39 B6
06F0  41 B1 37 26 82 CC 05 80 B6 32 BB 29 B7 29 B6 31
0700  B9 28 B7 28 0D 01 18 2B 0B 0C 28 04 3C 2A 20 27
0710  3C 2B 20 23 0C 28 04 3C 2C 20 1C 3C 2D 20 18 2B
0720  0B 0C 28 04 3A 2A 20 0F 3A 2B 20 0B 0C 28 04 3A
0730  2C 20 04 3A 2D 20 00 5A 27 42 21 00 B6 1F BB 16
0740  B7 16 B6 1E B9 15 B7 15 0D 01 18 2B 0B 0C 15 04
0750  3C 17 20 A4 3C 18 20 A0 0C 15 04 3C 19 20 99 3C
0760  1A 20 95 2B 0B 0C 15 04 3A 17 20 8C 3A 18 20 88
0770  0C 15 04 3A 19 20 81 3A 1A CC 06 F8 A6 AD C7 00
0780  08 A6 02 B7 09 B6 1C BB 16 B7 16 B6 1B B9 15 B7
0790  15 B6 2F BB 29 B7 29 B6 2E B9 28 B7 28 05 36 05
07A0  AE 10 CD 07 AE 0B 36 05 AE 23 CD 07 AE 81 E6 0C
07B0  B7 25 E6 08 E0 0A B7 3C E6 07 E0 09 B7 3E BB 3C
07C0  00 25 01 47 B7 3D B6 3B B0 3C 00 25 01 47 B7 3C
07D0  BB 01 2A 01 40 B7 3B B6 3D FB 2A 01 40 BB 3B E1
07E0  0D 23 10 6A 03 26 14 A3 10 26 04 10 36 20 0C 16
07F0  36 20 08 E6 03 E1 11 27 02 6C 03 B6 37 27 15 0A
0800  36 12 3A 12 26 0E A1 01 26 08 B6 20 E7 12 3A 45
0810  26 02 12 36 00 25 07 B6 3D F7 B6 3C E7 01 4F E7
0820  07 E7 08 E7 09 E7 0A 81 A6 1B B7 3A 0E 3E 03 0C
0830  72 37 01 39 02 A6 4E B7 3A B6 1B 00 36 02 B6 2E
0840  B7 3D B6 37 48 B7 3B AE 1B BD ED BD ED A6 2E B7
0850  3B BD BD B6 37 27 2A B6 1B E1 3D 26 04 A6 1B BD
0860  B7 B6 2E B1 3D 26 1A 20 0A B6 2E B1 4E 26 0A A6
0870  1B BD B7 A6 2E BD B7 20 08 A6 1B BD AF A6 2E BD
0880  AF 81 00 00 00 00 00 00 00 00 00 00 00 00 00 00
0890  43 6F 70 79 72 69 67 68 74 20 31 39 38 32 20 20
08A0  4D 6F 74 6F 72 6F 6C 61 20 49 6E 63 2E 20 20 20
1FF0  00 00 00 00 00 00 02 76 06 17 05 67 06 17 06 17
```

TABLE II

```
9A 01 29 33 40 0D 04 5C 9A 01 29 33 40 0D 04 5C
9A 01 29 33 40 0D 04 5C 9A 01 29 33 40 0D 04 5C
9A 01 29 33 40 0D 04 5C 9A 01 29 33 40 0D 04 5C
9A 01 29 33 40 0D 04 5C 00 2E 01 05 C0 0A A0 05
E4 91 2A 3C 92 0D 04 55 BF 49 26 37 E9 0D 04 55
30 30 09 09 09 0A 01 09 09 09 05 AA AA AA 00 00
A7 00 4A 64 51 57 59 4A 62 3E 6B 34 75 2E 80 22
8D 1A 9A 13 B7 07 C3 03 05 01 01 04 04 04 54 52
54 52 0A 05 09 09 09 00 00 00 00 00 00 00 00 79
```

When the hexadecimal program code shown in Table I is loaded into the microcomputer's internal memory and the code shown in Table II is loaded into the programmable ROM, the circuit will perform in a manner substantially the same as that of controller 30 with switch 280 in the A position and in addition will perform the decoding function for a 9-9-9-9-9 ZVEI code on data entering the PB6 input. If an encode is desired on each transmission (switch 280 in the B position), the tenth byte in line 3 of Table II should be changed from 2E to 3E. Also, the encoding function is performed and the output appears in the form of a 350 millisecond, 1200 Hz tone in digital form at outputs PD2 and PD3 when the microcomputer is clocked at a bus speed of 1 MHz. This output is processed by a two bit D/A converter 690 and a low pass filter 695 prior to being transmitted by transmitter 325. The output of receiver 10 is processed by a low pass filter 700 and then limited by a limiter 710 prior to input into the PB6 terminal of the microcomputer.

Thus, it is apparent that in accordance with the present invention a method and apparatus that fully satisfies the objects, aims, and advantages is set forth above. While the invention has been described in conjucntion with specific embodiments, it is evident that many alternatives, modifications and variations will be apparent to those skilled in the art in light of the foregoing description. Accordingly, it is intended that the present invention embrace all such alternatives, modifications and variations as fall within the spirit and broad scope of the appended claims.

What is claimed is:

1. In a transceiver including a transmitter and a receiver, a multiple function switch controller for controlling the transceiver by the operation of a switch, comprising:
   a timer responsive to said switch for establishing a time interval, the duration of said time interval being independent of the operation of said switch;
   first means, coupled to said timer and responsive to actuation of said switch occuring during said time interval, for producing a first transceiver control signal wherein said first control signal establishes a first operational mode for said transceiver; and
   second means, coupled to said timer and responsive to actuation of said switch occuring outside of said time interval, for producing a second transceiver control signal wherein said second control signal establishes a second operational mode for said transceiver;
   whereby, said switch controller allows said switch to control a plurality of transceiver functions.

2. A multiple function switch controller in accordance with claim 1, further including:
   means, responsive to said first control signal, for selectively enabling said transmitter; and
   annunciating means, responsive to said second control side, for annunciating the presence of activity on a selected communication channel.

3. A multiple function switch controller in accordance with claim 2, wherein said annunciating means in includes means for selectively directing audio frequency signals to a loudspeaker.

4. A multiple function switch controller in accordance with claim 2, further including an encoder coupled to said controller and said transmitter for encoding an address to be transmited by said transmitter;
   said encoder being enabled whenever said transmitter is enabled.

5. A multiple function switch controller in accordance with claim 1, further including a counter for counting the number of actuations of said switch occuring during said time interval.

6. A multiple function witch controller in accordance with claim 5, further including gating means, responsive to said counter, for providing a third control signal only on predetermined counts of said counter.

7. A multiple function switch controller in accordance with claim 6, further including an encoder coupled to said transmitter for encoding an address to be transmitted by said transmitter; and wherein said third control signal allows said encoder to be enabled ony when said counter indicates that switch is being actuated for a first time within said time interval.

8. A multiple function switch controller in accordance with claim 7, wherein said encoder includes a five tone sequential selective calling encoder.

9. A method of controlling the operation of a switch in a transmitter, comprising the steps of:
   timing an interval following operation of said switch, the duration of said time interval being independent of the operation of said switch;
   actuating said switch outside said time interval;
   alerting the user of the status of a communication channel upon actuation of asid switch outside of said time interval; actuating said switch during said time interval; and
   enabling said transmitter upon actuation of said switch occuring during said time interval.

10. A method in accordance with claim 9, further including the steps of:
    enabling an encoder upon a first of said actuations of said switch occuring during said time interval; and
    inhibiting said encoder upon subsequent actuations of said switch occuring during said time interval.

11. In a transceiver including a transmitter and a receiver, a multiple function switch controller, comprising:
    means for detecting operation of a switch;
    means coupled to said receiver for monitoring the activity of a selected communication channel;
    a timer, responsive to either said monitoring means or said detecting means, for establishing a time interval, the duration of said time interval being independent of the operation of said switch;
    means, responsive to actuation of said switch during said time interval, for enabling said transmitter; and
    means, responsive to actuation of said switch outside of said time interval, for annunciating the status of said communication channel.

12. A multiple function switch controller in accordance with claim 11, further including:
    means for detecting a first actuation of said switch occuring during said time interval; and
    means for enabling an encoder during said first actuation.

13. A multiple function switch controller in accordance with claim 12, further including means for inhibiting said encoder during second and subsequent actuations of said switch occuring during said time interval.

14. In a transceiver ncluding a transmitter and a receiver, a multiple function switch controller, comprising:
    means for detecting actuation of a switch;
    a decoder coupled to said receiver, for decoding received signals of a predetermined type;
    a timer, responsive to either said detecting means or said decoder, for establishing a time interval following each switch actuation or each decoding of a received signal of a predetermined type; and
    controller means, responsive to said timer and said switch, for placing said transceiver in a first mode of operation if said switch is actuated during said time interval and placing said transceiver in a second mode of operation if said switch is actuated outside of said time interval 15. A multiple function switch controller in accordance with claim 14, wherein:

said first mode of operation is associated with said transmitter; and said second mode of operation is associated with said receiver.

16. In a selective calling transceiver including a transmitter and a receiver, a multiple function switch controller for controlling the transceiver by the operation of a switch, comprising:
    a decoder for decoding a received signal including a predetermined address;
    a timer, responsive to said decoder, for establishing a time interval following each decoding of a received signal including a predetermined address;
    first means, responsive to actuation of said switch during said time interval for producing a first transceiver control signal; and
    second means responsive to actuation of said switch outside of said time interval for producing a second transceiver control signal.

17. A multiple function switch controller in accordance with claim 16, wherein said first control signal establishes a first operational mode for said transceiver and said second control signal establishes a second operational mode for said transceiver.

18. A multiple function switch controller in accordance with claim 17, further including:
    means, responsive to said first control signal, for selectively enabling said transmitter; and
    annunciating means, responsive to said second control signal, for annunciating the presence of activity on a selected communication channel.

19. A multiple function switch controller in accordance with claim 18, wherein said timer is also activated in response to said switch.

20. A multiple function switch controller in accordance with claim 19, further including means, responsive to actuation of said switch during said time interval, for enabling an encoder.

21. A multiple function switch controller in accordance with claim 20, further including a counter means for counting the number of actuations of said switch during said time interval.

22. A multiple function switch controller in accordance with claim 21, further including gating means, responsive to said counter for allowing said encoder to be enabled only on predetermined counts of said counter.

23. A multiple function switch controller in accordance with claim 22, wherein said gating means allows said encoder to be enabled only when said counter indicates that said switch is being actuated for a first time within said time interval.

24. A multiple function switch controller in accordance with claim 21, wherein said annunciating means includes means for selectively directing audio frequency signals to a loudspeaker.

25. In a transmitter, a method of controlling a switch, comprising the steps of:
    providing a timer responsive to said switch for establishing timing intervals in response to operation of said switch;
    detecting whether or not an output of said timer is a predetermined signal;
    counting actuations of said switch occurring while said timer output is said predetermined signal to establish a count;
    enabling said transmitter upon actuation of said switch occuring while said output is said predetermined signal;
    enabling an encoder to encode said transmitter's transmitted signal when said count equals a first predetermined count; and
    inhibiting said encoder when said count is equal to a second predetermined count.

26. In a transceiver including a tramsitter and a receiver, a switch controller for controlling the transceiver by the operation of a switch, comprising:
    a timer for establishing a time interval in response to said switch,
    first means, coupled to said timer and responsive to actuation of said switch during said time interval, for producing a first control signal to selectively enable said transmitter;
    second means, coupled to said timer and responsive to actuation of said switch outside of said time interval, for producing a second control signal;
    annunciating means, responsive to said second control signal, for annunciating the presence of activity on a selected communication channel; and
    a counter for counting actuations of said switch occuring during said time interval.

27. A switch controller in accordance with claim 26, further including gating means, responsive to said counter, for providing a third control signal only on predetermined counts of said counter.

28. A switch controller in accordance with claim 27, further including an encoder coupled to said transmitter for encoding an address to be transmitter by said transmitter; and wherein said third control signal allows said encoder to be enabled only when said counter indicates that said switch is being actuated for a first time within said time interval.

29. A switch controller in accordance with claim 28, wherein said encoder includes a five tone sequential selective calling encoder.

30. A switch controller in accordance with claim 29, wherein said annunciating means includes means for selectively directing audio frequency signals to a loudspeaker.

31. In a selective calling transceiver including a transmitter and a receiver, a switch controller for controlling the transceiver by the operation of a switch, comprising:
    a decoder for decoding a received signal including a predetermined address;
    a timer, responsive to said decoder and said switch, for establishing a time interval folllowing each decoding of a received signal including a predetermined address and following predetermined operations of said switch;
    first means, responsive to actuation of said switch during said time interval for producing a first control signal;
    means responsive to said first control signal for selectively enabling said transmitter;
    second means, responsive to actuation of said switch outside said time interval for producing a second control signal,
    annunciating means responsive to said second control signal for annunciating the presence of activity on a selected communication channel;
    means responsive to predetermined actuations of said switch during said time interval for enabling an encoder; and
    counter means for counting actuations of said switch during said time interval.

* * * * *